(12) United States Patent
Monde et al.

(10) Patent No.: US 12,151,633 B2
(45) Date of Patent: Nov. 26, 2024

(54) WORK VEHICLE

(71) Applicant: Kubota Corporation, Osaka (JP)

(72) Inventors: Yuki Monde, Sakai (JP); Kohta Nakao, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 18/389,053

(22) Filed: Nov. 13, 2023

(65) Prior Publication Data

US 2024/0157902 A1 May 16, 2024

(30) Foreign Application Priority Data

Nov. 14, 2022 (JP) .................................. 2022-181874

(51) Int. Cl.
*B60R 21/13* (2006.01)
(52) U.S. Cl.
CPC .................................. *B60R 21/13* (2013.01)
(58) Field of Classification Search
CPC .................................................. B60R 21/13
See application file for complete search history.

(56) References Cited

U.S. PATENT DOCUMENTS

| | | | |
|---|---|---|---|
| 10,967,825 B2* | 4/2021 | Hisamura | B62D 27/065 |
| 2014/0103627 A1* | 4/2014 | Deckard | B60R 22/00 |
| | | | 411/362 |
| 2014/0183906 A1* | 7/2014 | Kaku | B60R 21/13 |
| | | | 296/190.03 |

FOREIGN PATENT DOCUMENTS

JP 200559696 A 3/2005

* cited by examiner

*Primary Examiner* — Jason D Shanske
*Assistant Examiner* — Matthew James O'Neill
(74) *Attorney, Agent, or Firm* — The Webb Law Firm

(57) ABSTRACT

A work vehicle of the present invention includes a connection mechanism connecting ends of a first pipe and the second pipe. The connection mechanism includes a plate-shaped first joint member provided at the end of the first pipe, a plate-shaped second joint member provided at the end of the second pipe, and a coupling bolt coupling the first joint member and the second joint member to each other. The first joint member and the second joint member each have a coupling hole into which the coupling bolt is insertable, at a position exposed from the corresponding first or second pipe, and the first joint member and the second joint member are coupled to each other by the coupling bolt passed through the coupling holes while the plate surfaces of the first joint member and the second joint member overlap each other.

8 Claims, 6 Drawing Sheets

WORK VEHICLE

CROSS REFERENCE TO RELATED APPLICATION

This application claims priority to Japanese Patent Application No. 2022-181874, filed Nov. 14, 2022, the disclosure of which is hereby incorporated by reference in its entirety.

BACKGROUND OF THE INVENTION

Field of the Invention

The present invention relates to a work vehicle with a rollover protective structure (ROPS) that includes a plurality of pipes, and a connection mechanism that connects ends of the pipes in a longitudinal direction.

Description of Related Art

Patent Document 1 discloses a work vehicle with a ROPS. In this structure, pipe members of the ROPS are bent and the ROPS has a U-shape when viewed from a side. The ROPS of the work vehicle is coupled, at lower ends of the ROPS, to a transverse member fixed to a driver seat installation frame of the vehicle body via coupling members constituted by cast articles (see Patent Document 1).

PATENT DOCUMENT

Patent Document 1: JP 2005-59696A

The work vehicle disclosed in Patent Document 1 is advantageous in that the coupling members constituted by cast articles have fitting parts that are to be fitted to the pipe members constituting the ROPS or thread parts for fastening screws so as to be able to firmly fasten and fix the pipe members. However, there is a cost problem in that expensive molds are required to manufacture the cast articles. Furthermore, if a ROPS with a structure in which it is elongated in the front-rear direction to cover a work vehicle with rows of seats is employed, there may be a need to couple pipe members to each other in the front-rear direction of the ROPS or couple frame members for support in the left-right and up-down directions to each other. In this case, the coupling members of the heavy cast articles may be located in an upper section of the ROPS, and the center of gravity of the ROPS or the vehicle body is liable to be located at a higher position. Moreover, to realize coupling in multiple directions of the ROPS including, in addition to the front-rear direction, the left-right direction and the up-down direction, the structure of the coupling members themselves become complex, the size and weight of the molds increase, and the design also becomes complex taking into consideration, for example, the direction in which the coupling members are removed from the molds, resulting in an increase in cost. Thus, there is room for improvement in this regard.

SUMMARY OF THE INVENTION

The present invention aims to make it easy to prevent a connection mechanism of a ROPS of a work vehicle for connecting pipes to each other whose ends in their longitudinal direction face each other, from having an increased weight and a complex structure at connection positions.

A work vehicle according to the present invention includes:
a ROPS that includes a first pipe, a second pipe, and a connection mechanism connecting ends of the first pipe and the second pipe in a longitudinal direction,
wherein the connection mechanism includes:
a plate-shaped first joint member provided at the end of the first pipe in such a manner as to protrude from the end of the first pipe toward the second pipe;
a plate-shaped second joint member provided at the end of the second pipe in such a manner as to protrude from the end of the second pipe toward the first pipe; and
a coupling bolt coupling the first joint member and the second joint member to each other,
the first joint member has, at a position exposed from the first pipe, a coupling hole into which the coupling bolt is insertable, and the second joint member has, at a position exposed from the second pipe, a coupling hole into which the coupling bolt is insertable, and
the first joint member and the second joint member are coupled to each other by the coupling bolt passed through the coupling holes while plate surfaces of the first joint member and the second joint member overlap each other.

According to the present invention, as connection mechanisms, the plate-shaped first joint member protruding from the end of the first pipe, the plate-shaped second joint member protruding from the end of the second pipe toward the first pipe, and the coupling bolt are used. Also, the first joint member and the second joint member are bolted to each other, at a position exposed from the first pipe and the second pipe, while the plate surfaces of the first joint member and the second joint member overlap each other.

With this, the connection mechanism is constituted mainly by plate members, making it easy to realize a less expensive and more lightweight connection mechanism than in a case where a connection mechanism is constituted by cast articles that require a mold. Accordingly, it is possible to prevent a situation in which the connection mechanism has an increased weight at, for example, a position at which it is connected to an upper section of the ROPS, and the center of gravity of the entire ROPS is located at a higher position. Also, since the connection mechanism can have a configuration using a coupling structure of only plate materials and bolts, it has the advantage that the structure can be easily simplified and assembling and disassembling are also easy.

In one appropriate embodiment of the present invention, the connection mechanism further includes:
a first mounting seat plate fixed to the end of the first pipe, the first mounting seat plate having a surface intersecting the longitudinal direction; and
a second mounting seat plate fixed to the end of the second pipe, the second mounting seat plate having a surface intersecting the longitudinal direction, and
the first joint member is mounted to the first pipe via the first mounting seat plate, and the second joint member is mounted to the second pipe via the second mounting seat plate.

With this measure, the first joint member and the second joint member are respectively mounted to the first pipe and the second pipe via the first mounting seat plate having the surface intersecting the end of the first pipe, and the second mounting seat plate having the surface intersecting the end of the second pipe. Accordingly, the cross-sectional shapes of the first joint member and the second joint member do not need to conform to the cross-sectional shapes of the first pipe and the second pipe, and thus the first joint member and the second joint member can have any cross-sectional shape regardless of the cross-sectional shapes of the first pipe and the second pipe. With this, any shape can be employed as the cross-sectional shapes of the first joint member and the second joint member, taking into consideration a structure that allows easy connection of the joint members, or the like.

In one appropriate embodiment of the present invention, the ROPS further includes at least one cross frame connected to the first pipe and the second pipe in a direction in which the at least one cross frame intersects the first pipe and the second pipe,
the first pipe and the second pipe are at a distance from each other in the longitudinal direction,
the at least one cross frame has a connection target end at a position within the distance in the longitudinal direction,
the first joint member and the second joint member of the connection mechanism each include a joint branch extending in a direction in which the at least one cross frame is present, and
the at least one cross frame is coupled to at least one of the joint branches.

With this measure, since the joint branches extending from the first joint member and the second joint member can be coupled to the at least one cross frame connected to the first pipe and the second pipe in the direction in which the at least one cross frame intersects the first pipe and the second pipe, the first joint member and the second joint member can be used not only as a means for coupling the first pipe and the second pipe to each other but also as a means for coupling the first pipe and the second pipe to the cross frame using at least one of the joint branches.

In one appropriate embodiment of the present invention, the at least one cross frame is a vertical post frame connected to the first pipe and the second pipe in such a manner as to intersect the first pipe and the second pipe along an up-down direction.

With this measure, when the vertical post frame is provided that supports the ROPS at an intermediate position of the elongated section of the ROPS, the connection mechanism that connects the first pipe and the second pipe can also be used as a connecting means used when the vertical post frame is provided.

In one appropriate embodiment of the present invention, the at least one cross frame is a horizontal bridge frame connected to the first pipe and the second pipe in such a manner as to intersect the first pipe and the second pipe along a horizontal direction.

With this measure, when the horizontal bridge frame is provided that supports the ROPS at an intermediate position of the elongated section of the ROPS, the connection mechanism that connects the first pipe and the second pipe can also be used as a connecting means used when the horizontal bridge frame is provided.

In one appropriate embodiment of the present invention, the vertical post frame is a rectangular pipe member with a rectangular cross section, and includes:
 a cylindrical boss made of a tubular member penetrating the rectangular pipe member in a radial direction; and
 a fixation bolt passed through the cylindrical boss, and
the joint branch is configured to be pressed against and fixed to an end surface of the cylindrical boss while the fixation bolt is fastened.

With this measure, because the fastening force of the fixation bolt is received by the end surface of the cylindrical boss and does not act on the rectangular pipe member, the joint branch and the vertical post frame can be strongly coupled to each other by fastening the fixation bolt.

In one appropriate embodiment of the present invention, the horizontal bridge frame is channel-shaped with an opening facing downward, the horizontal bridge frame including an upward facing surface extending in the horizontal direction, and downward extending side surfaces bent downward from two sides of the upward facing surface,
the joint branches of the first joint member and the second joint member are laid on the upward facing surface,
the upward facing surface and the joint branches of the first joint member and the second joint member each have a bolt insertion hole, and
the upward facing surface, the first joint member, and the second joint member are configured to be coupled and fixed to each other by an upper coupling bolt passed through the bolt insertion holes.

With this measure, the three components, namely, the first joint member, the second joint member, and the upward facing surface of the horizontal bridge frame can be fastened and fixed to each other by the upper coupling bolt in a state in which they are jointly fastened.

In one appropriate embodiment of the present invention, the at least one cross frame includes:
 a vertical post frame connected to the first pipe and the second pipe in such a manner as to intersect the first pipe and the second pipe along an up-down direction; and
 a horizontal bridge frame connected to the first pipe and the second pipe in such a manner as to intersect the first pipe and the second pipe along a horizontal direction,
the vertical post frame is a rectangular pipe member with a rectangular cross section, and includes:
 a cylindrical boss made of a tubular member penetrating the rectangular pipe member in a radial direction; and
 a fixation bolt passed through the cylindrical boss,
the joint branch is configured to be pressed against and fixed to an end surface of the cylindrical boss while the fixation bolt is fastened,
the horizontal bridge frame is channel-shaped with an opening facing downward, the horizontal bridge frame including an upward facing surface extending in the horizontal direction, and downward extending side surfaces bent downward from two sides of the upward facing surface,
the joint branches of the first joint member and the second joint member are laid on the upward facing surface,
the upward facing surface and the joint branches of the first joint member and the second joint member each have a bolt insertion hole,
the upward facing surface, the first joint member, and the second joint member are configured to be coupled and fixed to each other by an upper coupling bolt passed through the bolt insertion holes, and
the horizontal bridge frame has, at an end thereof located between the bolt insertion hole and the vertical post frame, a downward extending end surface bent downward from the upward facing surface, the downward extending end surface including a coupling target section facing an opposite end surface opposite to the end surface of the cylindrical boss, the fixation bolt passed through the cylindrical boss being passed through a coupling hole formed in the coupling target section, and the downward extending end surface being configured to be pressed against the opposite end surface of the cylindrical boss while the fixation bolt is fastened.

With this measure, since the vertical post frame and the horizontal bridge frame are coupled at the position at which the first pipe and the second pipe are connected, the elongated ROPS can be strongly supported at an intermediate position in the front-rear direction, along the up-down and left-right directions.

Moreover, since the downward extending end surface at an end of the horizontal bridge frame is also effectively used as a means for connecting the vertical post frame and the horizontal bridge frame, it is possible to realize a ROPS with a more robust structure, with a simple structure.

In one appropriate embodiment of the present invention, the first pipe and the second pipe are each a deformed tube with a non-circular cross-sectional shape.

With this measure, when, for example, a ROPS provided with front or rear doors that have seals employs deformed tubes having a seal receiving surface, it is possible to realize an appropriate connection mechanism that can be easily applied to a position at which the first pipe and the second pipe are formed of deformed tubes.

BRIEF DESCRIPTION OF THE DRAWINGS

The terms Fig., FIG., Figs., FIGs., Figure, and Figures are used interchangeably to refer to the corresponding figures in the drawings.

DESCRIPTION OF THE INVENTION

Figure 1:
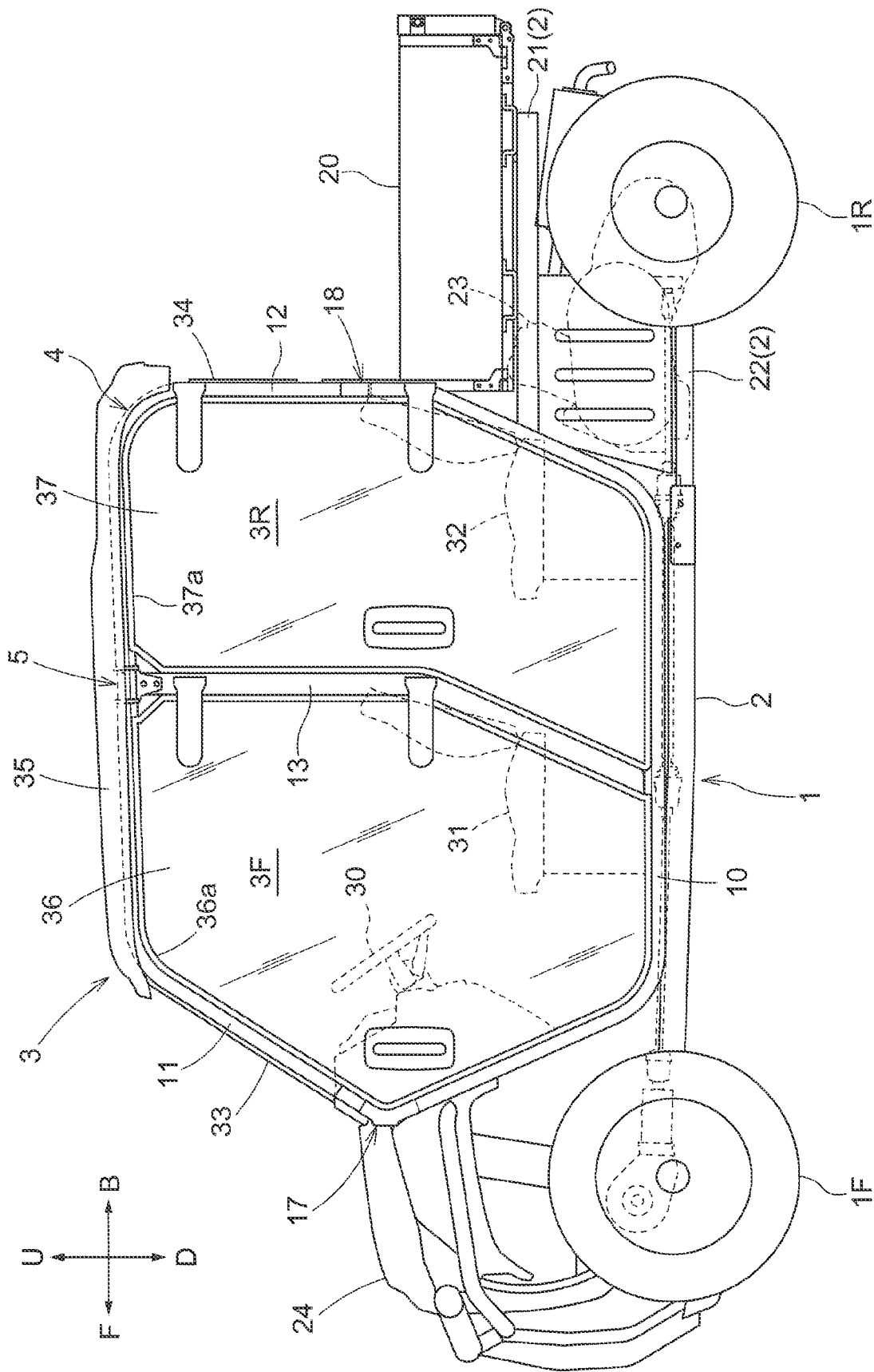
FIG. 1 is a left side view illustrating a work vehicle.

Best Mode for Carrying Out the Invention

Hereinafter, an exemplary embodiment of a work vehicle according to the present invention is described in reference to the content of the drawings.

Note that the front-rear direction and the left-right direction in the description of the present embodiment are defined as follows, unless otherwise stated. That is to say, when a multi-purpose work vehicle, which is an example of a work vehicle to which the present invention is applied, travels, the travel direction when it travels forward is defined as "front" (see the arrow F in FIG. 2), the travel direction when it travels rearward is defined as "rear" (see the arrow B in FIG. 2), the direction that corresponds to the right of the multi-purpose work vehicle oriented forward in the front-rear direction is defined as "right" (see the arrow R in FIG. 2), and the direction that corresponds to the left thereof is defined as "left" (see the arrow L in FIG. 2). Also, the arrow U in the drawings indicates the "upper" direction and the arrow D indicates the "lower" direction.

[Overall Configuration]

FIG. 1 shows the entire multi-purpose work vehicle, which is an example of the work vehicle according to the present invention.

As shown in FIG. 1, the multi-purpose work vehicle is provided with a travel vehicle body 1 in which the front section of a vehicle body frame 2 is supported by left and right steerable front wheels 1F, and the rear section of the vehicle body frame 2 is supported by left and right non-steerable rear wheels 1R.

In the rear section of the vehicle body frame 2, the vehicle body frame 2 includes an upper frame 21 on which a loading platform 20 is mounted, and a lower frame 22 that is provided below the upper frame 21 and supports a drive device 23 such as an engine. Power from the drive device 23 is transmitted to the rear wheels 1R and is branched and transmitted to the front wheels 1F as well, so that the travel vehicle body 1 is capable of four-wheel driving. The loading platform 20 is configured to be able to swing with its rear end used as the swinging pivot and dump loads.

A boarding section 3 with a ROPS 4 is provided at a position on the vehicle body frame 2 behind a front bonnet 24 and forward of the loading platform 20.

The boarding section 3 is divided into a front room 3F and a rear room 3R. The front room 3F is provided with a steering handle 30 and a front seat 31, and the rear room 3R is provided with a rear seat 32.

A windshield 33 is provided at the front of the boarding section 3 with the ROPS 4, a rear glass 34 is provided at the rear thereof, and a roof 35 is located at the upper section of the ROPS 4. Right and left front doors 36 are respectively provided in a right-side section and a left-side section at the front of the ROPS 4, and right and left rear doors 37 are respectively provided in a right-side section and a left-side section at the rear of the ROPS 4.

[ROPS]

Figure 2:
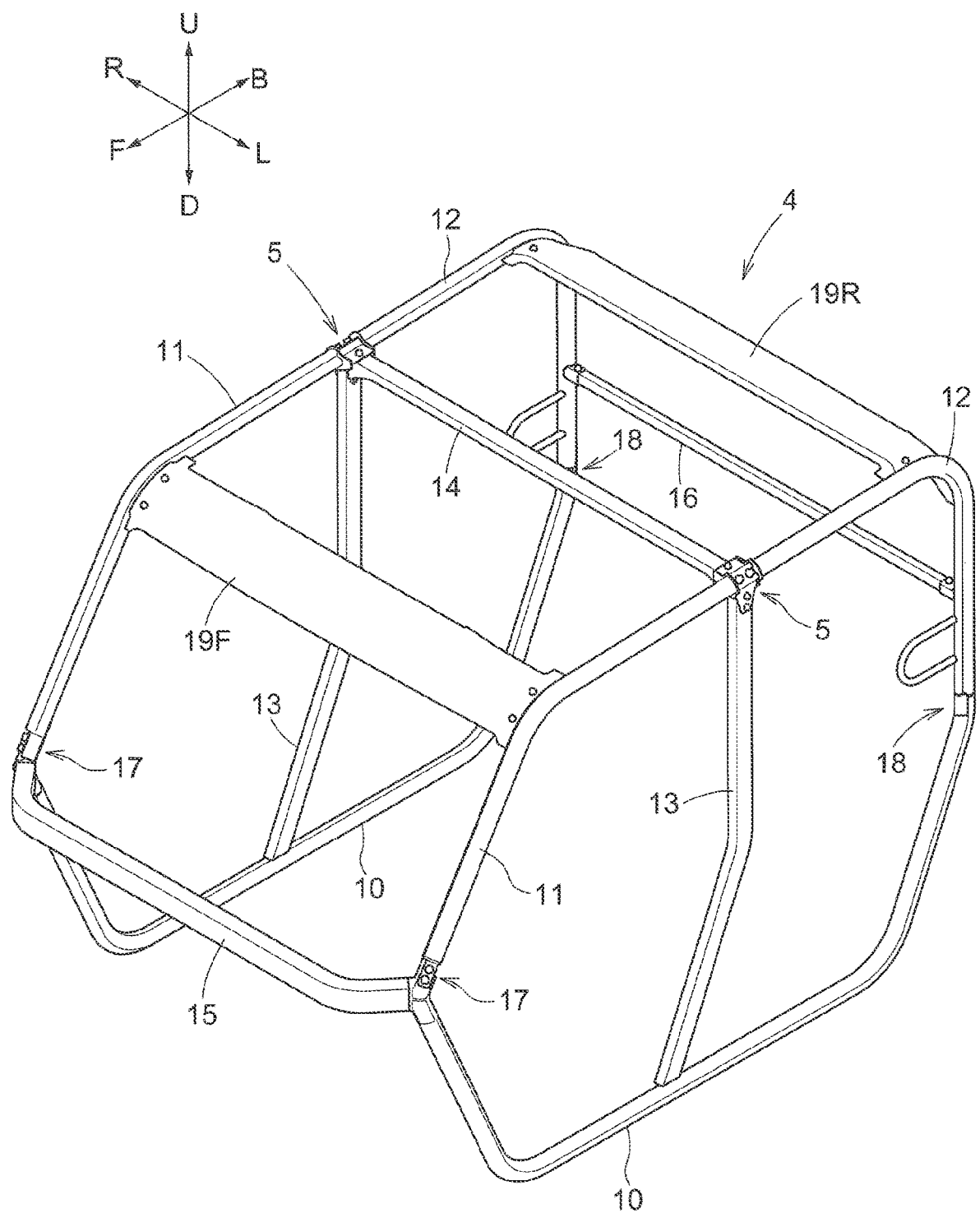
FIG. 2 is a perspective view illustrating a ROPS in its entirety.

As shown in FIGS. 1 and 2, the ROPS 4 includes: right and left lower pipes 10 that are channel-shaped when viewed from a side; right and left front upper pipes 11 (corresponding to first pipes) that are angle-shaped when viewed from a side; right and left rear upper pipes 12 (corresponding to second pipes) that are angle-shaped when viewed from a side; right and left vertical post frames 13 (corresponding to cross frames); and a horizontal bridge frame 14 (corresponding to a cross frame), and the like.

The front upper ends of the lower pipes 10 are respectively coupled to the lower ends of the front upper pipes 11 via vertical joint members 17. A front transverse frame 15 is coupled between the right and left vertical joint members 17, and a flat-plate shaped coupling plate 19F is coupled between the right and left front upper pipes 11.

The rear upper ends of the lower pipes 10 are respectively coupled to the lower ends of the rear upper pipes 12 via rear vertical joint members 18. A rear transverse frame 16 and a flat-plate shaped coupling plate 19R are coupled between the right and left rear upper pipes 12. The rear end of each front upper pipe 11 and the front end of the corresponding rear upper pipe 12 are disposed in a state in which they face each other in the longitudinal direction, and are connected to each other via a later-described connection mechanism 5.

The right and left vertical post frames 13 are each provided, while extending along the up-down direction, between the position corresponding to the midpoint of the corresponding lower pipe 10 in the front-rear direction, and the position at which the rear end of the corresponding front upper pipe 11 and the front end of the corresponding rear upper pipe 12 are coupled to each other. The vertical post frames 13 are bolted at their lower end sections to a support member (not shown) of the front seat 31 standing upright from the vehicle body frame 2, and are coupled at their upper end sections to both the front upper pipes 11 and the rear upper pipes 12 via the later-described connection mechanisms 5.

The horizontal bridge frame 14 is coupled, while extending along the left-right direction, between a position at which the rear end of the right front upper pipe 11 and the front end of the right rear upper pipe 12 are coupled to each other, and a position at which the rear end of the left front upper pipe 11 and the front end of the left rear upper pipe 12 are coupled to each other. That is, the rear ends of the front upper pipes 11 are respectively coupled to the front ends of the rear upper pipes 12 via the later-described connection mechanisms 5, and the two ends of the horizontal bridge frame 14 are also coupled to the front upper pipes 11 and the rear upper pipes 12 via the later-described connection mechanisms 5.

The lower pipes 10, the front upper pipes 11, and the rear upper pipes 12 constituting the ROPS 4 are deformed tubes having a non-circular cross-sectional shape. Employing deformed tubes makes it easier to form a flat surface or a recessed surface on seal receiving surfaces of the ROPS 4 that abut against rubber seal members 36a and 37a attached to peripheral parts of the front doors 36 and the rear doors 37, thus making it easy to suppress, for example, entrance of rain water.

Figure 3:
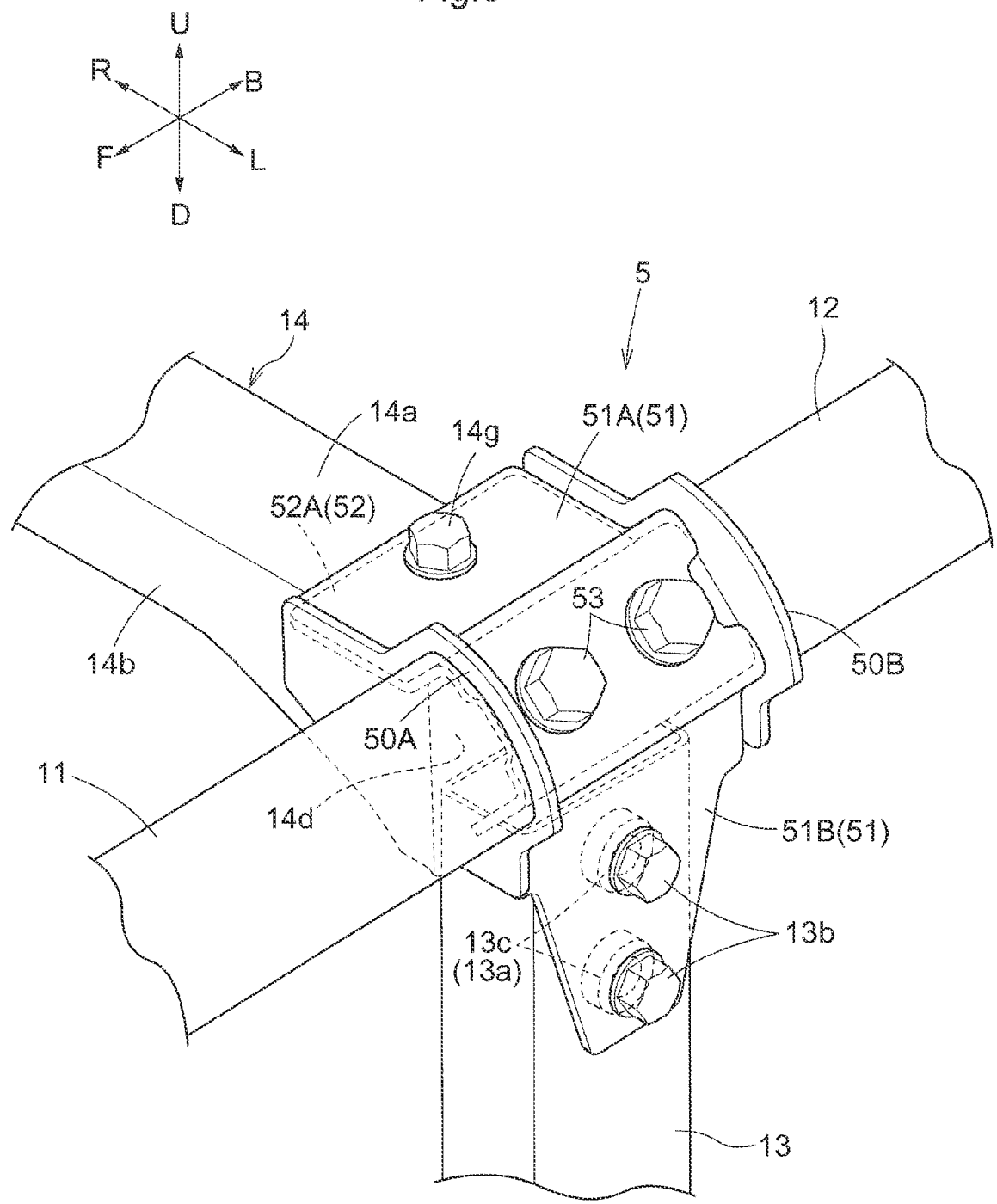
FIG. 3 is a perspective view illustrating a connection mechanism.
Figure 4:
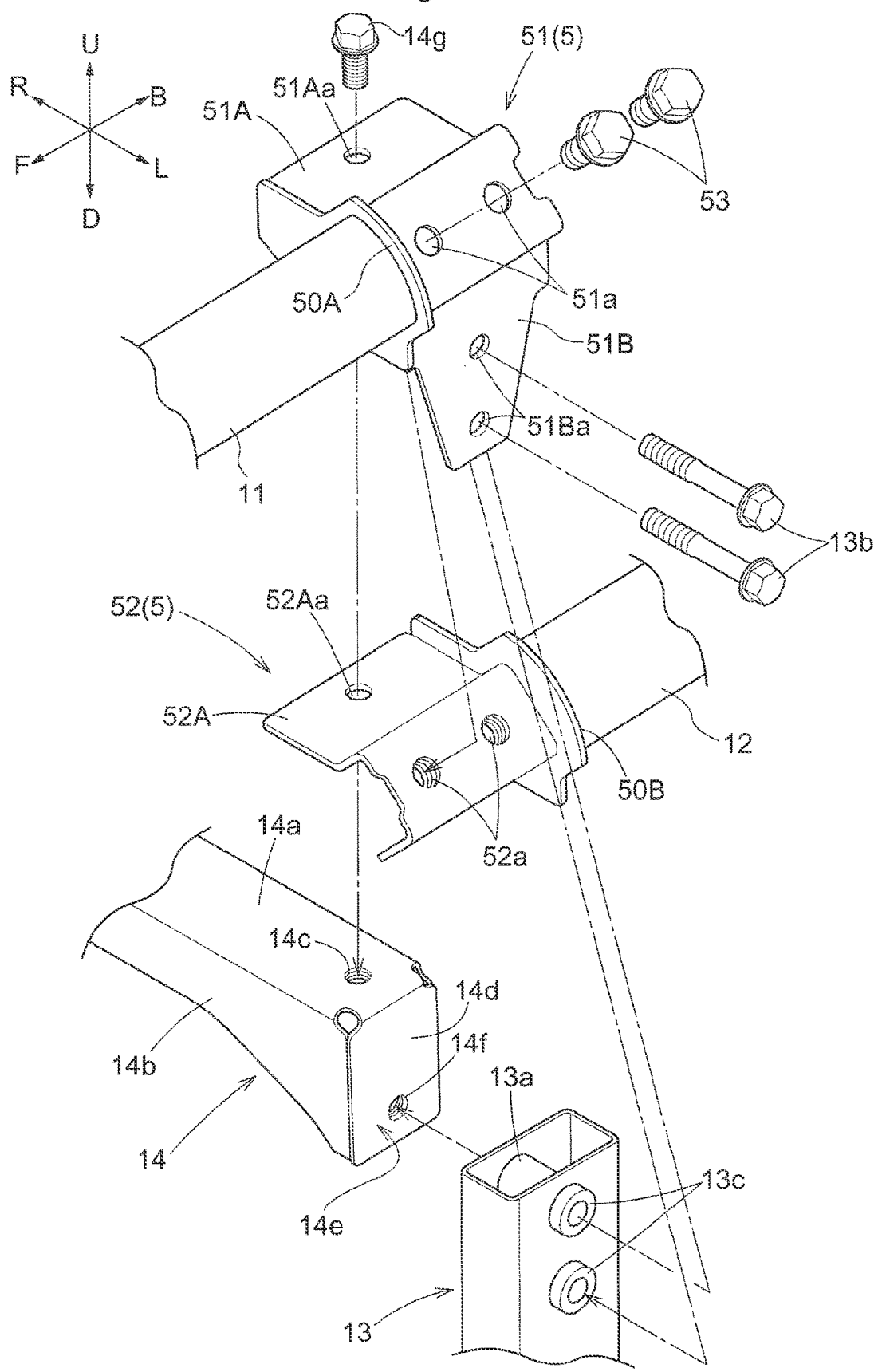
FIG. 4 is an exploded perspective view illustrating the connection mechanism.
Figure 5:
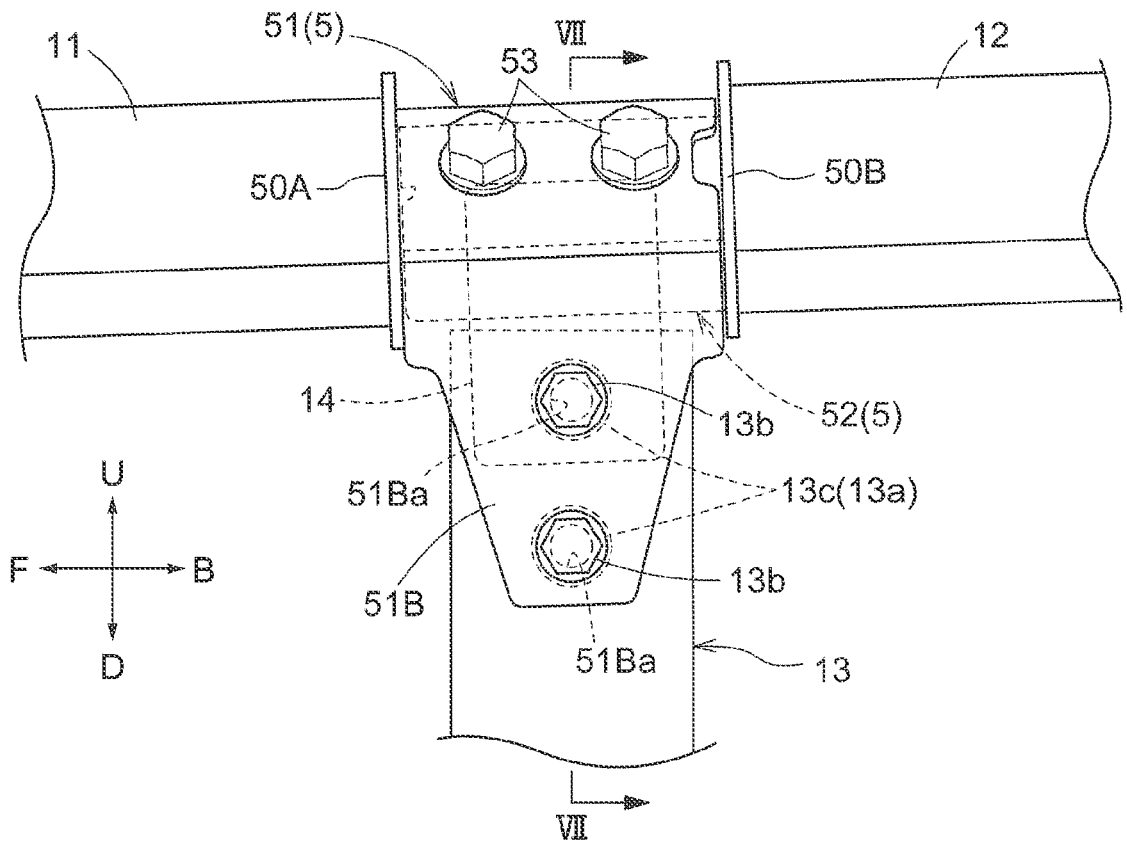
FIG. 5 is a left side view illustrating the connection mechanism.

As shown in FIGS. 3 and 4, the right and left vertical post frames 13 are each formed of a rectangular pipe member with a rectangular cross section whose longer sides extend in the front-rear direction.

Figure 6:
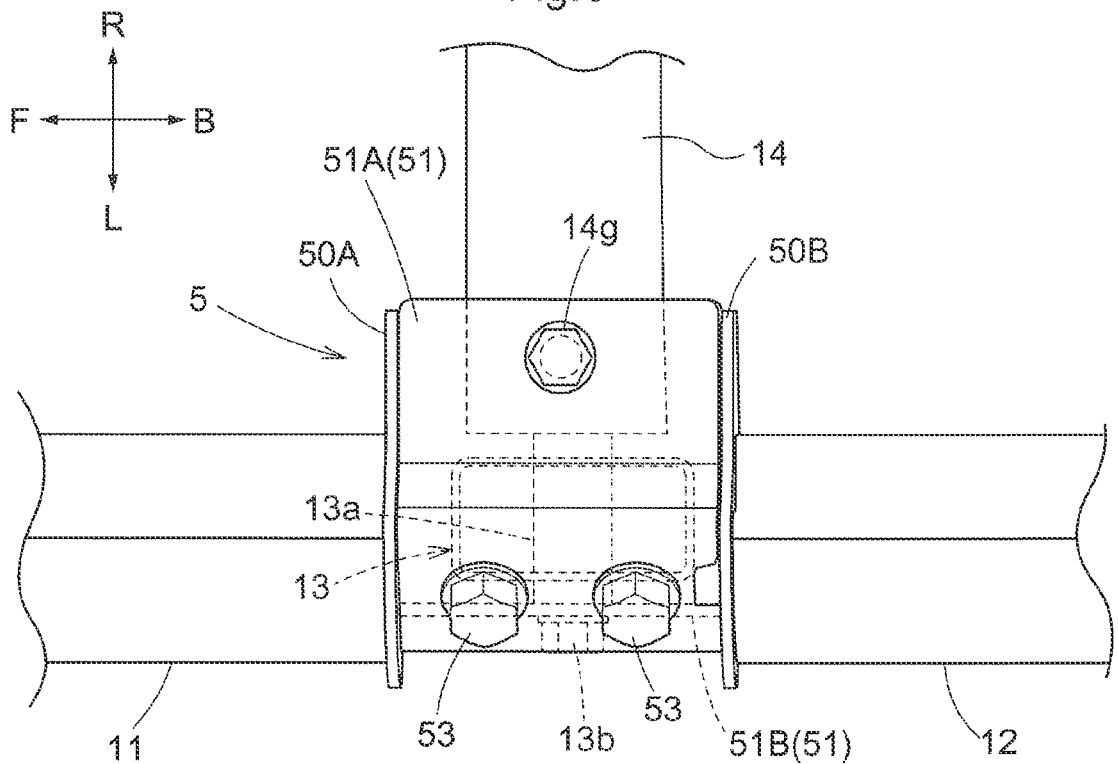
FIG. 6 is a plan view illustrating the connection mechanism.
Figure 7:
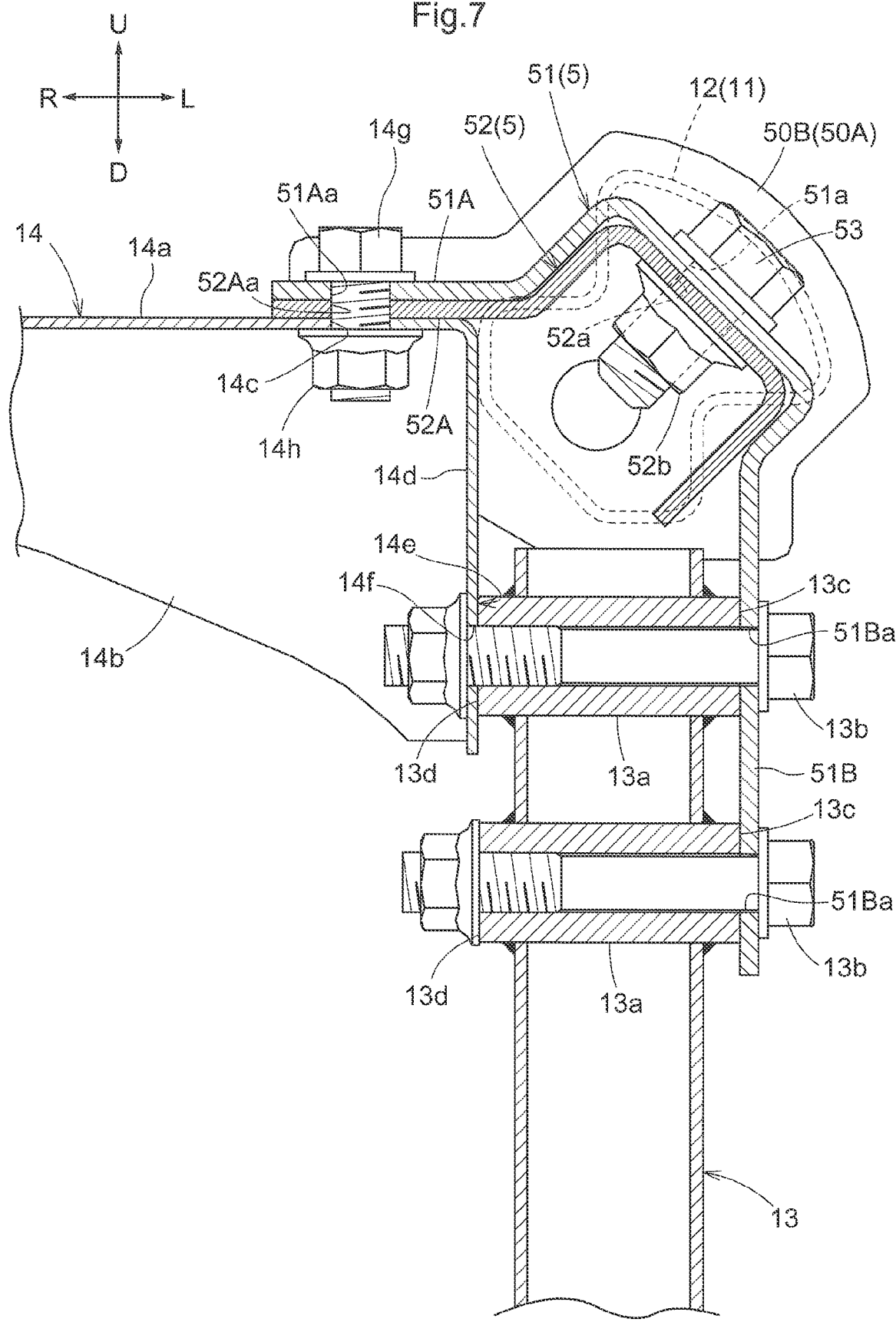
FIG. 7 is a cross-sectional view taken along a line VII-VII in FIG. 5.

As shown in FIGS. 6 and 7, the upper section of the vertical post frame 13, which serves as a connection target end, is provided so as to be located at a position between the rear end of the front upper pipe 11 and the front end of the rear upper pipe 12 in the front-rear direction, the position corresponding to a position within the distance, in the left-right direction, between the rear end of the front upper pipe 11 and the front end of the rear upper pipe 12.

Also, in the upper section of the vertical post frame 13, cylindrical bosses 13a that are made of a tubular member penetrating the rectangular pipe member in a radial direction (left-right direction) are welded and fixed at two positions aligned in the vertical direction. Each of the cylindrical bosses 13a has an inner diameter that enables a fixation bolt 13b of the later-described connection mechanism 5 to be inserted into the cylindrical boss 13a, and by fastening the inserted fixation bolt 13b, it is possible to couple the vertical post frame 13 and the connection mechanism 5 to each other.

A joint branch 51B of the connection mechanism 5 abuts against, out of two end surfaces 13c and 13d of each cylindrical boss 13a, the outer end surface 13c in the left-right direction, and a coupling target section 14e included in a later-described downward extending end surface 14d of the horizontal bridge frame 14 abuts against the opposite end surface 13d. By inserting and fastening the fixation bolts 13b in a state in which the joint branch 51B and the coupling target section 14e abut against the corresponding end surfaces 13c and 13d, the vertical post frame 13, the horizontal bridge frame 14, and the connection mechanism 5 are coupled to each other.

As shown in FIGS. 3, 4, and 7, the horizontal bridge frame 14 is channel-shaped with an opening facing downward, and includes an upward facing surface 14a extending in a horizontal direction, and downward extending side surfaces 14b bent downward from two end sides of the upward facing surface 14a. Also, a bolt insertion hole 14c into which a bolt 14g for coupling the horizontal bridge frame 14 to the later-described connection mechanism 5 is inserted is formed in the upward facing surface 14a at a position near each of two ends in the left-right direction. Also, the downward extending end surface 14d bent downward from the upward facing surface 14a is provided at an end thereof located between the vertical post frame 13 and the bolt insertion hole 14c, and the downward extending end surface 14d includes the coupling target section 14e that faces the opposite end surface 13d of the cylindrical boss 13a. The coupling target section 14e is located at substantially the same level as the cylindrical boss 13a provided in the upper section of the vertical post frame 13, and has a bolt insertion hole 14f into which the fixation bolt 13b can be inserted.

[Connection Mechanism]

The connection mechanism 5 that couples the ends, in the longitudinal direction, of the front upper pipe 11, which corresponds to a first pipe, and the rear upper pipe 12, which corresponds to a second pipe, to each other has the following configuration.

The connection mechanism 5 includes: a first mounting seat plate 50A that is welded and fixed to the rear end of the front upper pipe 11, and has a surface that intersects the longitudinal direction of the front upper pipe 11; a plate-shaped first joint member 51 that is welded and fixed to the surface (rear surface) of the first mounting seat plate 50A on a side opposite to the side on which the first mounting seat plate 50A is welded and fixed to the front upper pipe 11; a second mounting seat plate 50B that is welded and fixed to the front end of the rear upper pipe 12, and has a surface that intersects the longitudinal direction of the rear upper pipe 12; a plate-shaped second joint member 52 that is welded and fixed to the surface (front surface) of the second mounting seat plate 50B on a side opposite to the side on which the second mounting seat plate 50B is welded and fixed to the rear upper pipe 12; and coupling bolts 53 for coupling the first joint member 51 and the second joint member 52 that overlap each other.

The first joint member 51 is located on the rear side of the first mounting seat plate 50A welded and fixed to the rear end of the front upper pipe 11, and the second joint member 52 is located on the front side of the second mounting seat plate 50B welded and fixed to the front end of the rear upper pipe 12. That is to say, the first joint member 51 and the second joint member 52 are both located at positions exposed from the front upper pipe 11 and the rear upper pipe 12, and coupling holes 51a and 52a into which the coupling bolts 53 are inserted are formed at the exposed positions.

With this, by fastening the plate-shaped first joint member 51 and the second joint member 52 in the plate thickness direction at the positions exposed from the front upper pipe 11 and the rear upper pipe 12, instead of applying a fastening force to the front upper pipe 11 and the rear upper pipe 12 in the radial direction to connect the front upper pipe 11 and the rear upper pipe 12 to each other, it is possible to connect the front upper pipe 11 and the rear upper pipe 12 without causing any deformation caused by the fastening.

As shown in FIGS. 3, 4, and 7, the plate-shaped first joint member 51 and the second joint member 52 have a channel shaped cross-section, and the coupling holes 51a and 52a are formed at positions corresponding to the bottom section of the channel. Due to the channel shaped cross sections, the first joint member 51 and the second joint member 52, which are plate-shaped members, have a large moment of inertia area, and are less likely to deform.

Welding nuts 52b for fixation are welded and fixed coaxially with, out of the coupling holes 51a and 52a, the coupling holes 52a in the inner-most second joint member 52. Accordingly, the coupling bolts 53 can be fastened externally.

As shown in FIGS. 3 to 7, the first mounting seat plate 50A and the second mounting seat plate 50B each have an outer diameter greater than the outer diameters of the front upper pipe 11 and the rear upper pipe 12. As a result of the first mounting seat plate 50A and the second mounting seat plate 50B with a larger outer diameter being welded and fixed to the end of the front upper pipe 11 and the end of the rear upper pipe 12, flange parts are respectively formed at the end of the front upper pipe 11 and the end of the rear upper pipe 12. This prevents deformation of the front upper pipe 11 and the rear upper pipe 12 at a connection position, achieving an advantageous effect of improving the strength.

[Joint Branch]

As shown in FIGS. 3 to 7, the first joint member 51 and the second joint member 52 of the connection mechanism 5 include the joint branches 51A, 51B, and 52A that extend in directions in which the vertical post frame 13 or the horizontal bridge frame 14, serving as a cross frame, is present.

In the first joint member 51 integrated with the front upper pipe 11, the joint branches 51A and 51B extending in the respective directions in which the vertical post frame 13 and the horizontal bridge frame 14 are present are integrated with a plate member constituting the first joint member 51.

Of the joint branches 51A and 51B, the joint branch 51A horizontally extending in the direction in which the horizontal bridge frame 14 is present has a hole 51Aa into which a coupling bolt 14g can be inserted.

The joint branch 51B extending downward in the direction in which the vertical post frame 13 is present has holes 51Ba into which the fixation bolts 13b can respectively be inserted.

In the second joint member 52 integrated with the rear upper pipe 12, the joint branch 52A horizontally extending in the direction in which the horizontal bridge frame 14 is present is provided, but no joint branch is provided in the direction in which the vertical post frame 13 is present.

The joint branch 52A has a hole 52Aa into which the coupling bolt 14g can be inserted, at the same position as the hole 51Aa in the joint branch 51A of the first joint member 51.

With this, the coupling bolt 14g can pass through the hole 51Aa and the hole 52Aa, and can fix the joint branch 51A of the first joint member 51 and the joint branch 52A of the second joint member 52 to the upward facing surface 14a of the horizontal bridge frame 14 in a state in which they are jointly fastened. A welding nut 14h that is to be screwed onto the coupling bolt 14g is welded and fixed to the underside of the upward facing surface 14a of the horizontal bridge frame 14.

As shown in FIGS. 4 and 7, the downward extending end surface 14d provided at an end of the horizontal bridge frame 14 located between the bolt insertion hole 14c thereof and the vertical post frame 13, and the coupling target section 14e included in a lower part of the downward extending end surface 14d enable coupling of the horizontal bridge frame 14 and the vertical post frame 13.

That is to say, although the downward extending end surface 14d and the coupling target section 14e do not correspond to the joint branches 51A, 51B, and 52A, the bolt insertion hole 14f into which the fixation bolt 13b can be inserted is provided at a position facing the opposite end surface 13d of the cylindrical boss 13a, and thus the downward extending end surface 14d and the coupling target section 14e are used as a means to couple the horizontal bridge frame 14 and the vertical post frame 13 to each other in cooperation with the joint branch 51B of the first joint member 51.

Other Embodiments

The following describes other embodiments. A plurality of the following other embodiments may be applied in combination to the above-described embodiment so long as no contradiction arises. Note that the scope of the present invention is not limited to the content of the embodiments.

(1) In the above-described embodiment, a work vehicle that has a structure in which it is driven by the engine provided in the drive device 23 was exemplified, but the present invention is not necessarily limited to this structure.

For example, the drive source is not limited to a gasoline engine or a diesel engine, and may be a hybrid engine, an electric motor provided with a battery, or the like.

Other configurations may be equivalent to the configurations of the above-described embodiment.

(2) In the above-described embodiment, a work vehicle that has a structure in which the first joint member 51 and the second joint member 52 are mounted to the first pipe and the second pipe via the first mounting seat plate 50A and the second mounting seat plate 50B was exemplified, but the present invention is not necessarily limited to this structure.

For example, a structure may also be employed in which the first joint member 51 and the second joint member 52 are directly mounted to the first pipe and the second pipe without using the first mounting seat plate 50A and the second mounting seat plate 50B.

Other configurations may be equivalent to the configurations of the above-described embodiment.

(3) In the above-described embodiment, a work vehicle that has a structure in which the first joint member 51 is provided with two joint branches, namely, the joint branch 51A and the joint branch 51B was exemplified, but the present invention is not necessarily limited to this structure.

For example, a structure may also be employed in which only one of the joint branch 51A and the joint branch 51B is provided, three or more joint branches are provided, or no joint branch is provided.

Other configurations may be equivalent to the configurations of the above-described embodiment.

(4) In the above-described embodiment, a work vehicle that has a structure in which, as the cross frames, two types of cross frames, namely, the vertical post frames 13 and the horizontal bridge frame 14 are employed was exemplified, but the present invention is not necessarily limited to this structure.

For example, a structure may also be employed in which only one type of the vertical post frames 13 and the horizontal bridge frame 14 is provided, three or more types of cross frames are provided, or no cross frame is provided.

Other configurations may be equivalent to the configurations of the above-described embodiment.

(5) In the above-described embodiment, a work vehicle that has a structure in which the connection mechanism 5 is provided at one intermediate position of the ROPS 4 in the front-rear direction was exemplified, but the present invention is not necessarily limited to this structure. For example, a structure may also be employed in which a plurality of connection mechanisms 5 are provided at intermediate positions of the ROPS 4 in the front-rear direction.

Other configurations may be equivalent to the configurations of the above-described embodiment.

(6) In the above-described embodiment, the connection mechanism 5 was exemplified as a means for connecting pipes of the ROPS 4, but the connection mechanism 5 may also be used as a means for connecting pipes of a component other than the ROPS 4.

Other configurations may be equivalent to the configurations of the above-described embodiment.

INDUSTRIAL APPLICABILITY

The present invention is applicable to not only a multi-purpose work vehicle but also a work vehicle for agricultural work such as a riding mower or a tractor, a work vehicle for civil engineering work such as a wheel loader, a forklift, a carrying vehicle, or the like.

DESCRIPTION OF REFERENCE SIGNS

4 ROPS frame
5 Connection mechanism
11 First pipe
12 Second pipe
13 Vertical post frame
13a Cylindrical boss
13b Fixation bolt
13c End surface
13d Another end surface
13, 14 Cross frame
14 Horizontal bridge frame
14a Upward facing surface
14b Downward extending side surface
14c Bolt insertion hole
14d Downward extending end surface
14e Coupling target section
14f Coupling holes
14g Upper coupling bolt
14c, 51Aa, 52Aa Bolt insertion hole
50A First mounting seat plate
50B Second mounting seat plate
51 First joint member
51a, 52a Coupling holes
51A, 51B, 52A Joint branch
52 Second joint member
53 Coupling bolt

The invention claimed is:

1. A work vehicle comprising:
a ROPS (Rollover Protection Structure) that comprises a first pipe, a second pipe, and a connection mechanism connecting ends of the first pipe and the second pipe in a longitudinal direction,
wherein the connection mechanism comprises:
a plate-shaped first joint member provided at the end of the first pipe in such a manner as to protrude from the end of the first pipe toward the second pipe;
a plate-shaped second joint member provided at the end of the second pipe in such a manner as to protrude from the end of the second pipe toward the first pipe; and
a coupling bolt coupling the first joint member and the second joint member to each other,
wherein the first joint member has, at a position exposed from the first pipe, a coupling hole into which the coupling bolt is insertable, and the second joint member has, at a position exposed from the second pipe, a coupling hole into which the coupling bolt is insertable, and
wherein the first joint member and the second joint member are coupled to each other by the coupling bolt passed through the coupling holes while plate surfaces of the first joint member and the second joint member overlap each other,
wherein the ROPS further comprises at least one cross frame connected to the first pipe and the second pipe in a direction in which the at least one cross frame intersects the first pipe and the second pipe,
wherein the at least one cross frame comprises a horizontal bridge frame connected to the first pipe and the second pipe in such a manner as to intersect the first pipe and the second pipe along a horizontal direction, and
wherein the horizontal bridge frame is channel-shaped with an opening facing downward, the horizontal bridge frame having an upward facing surface extending in the horizontal direction, and downward extending side surfaces bent downward from two sides of the upward facing surface.

2. The work vehicle according to claim 1,
wherein the connection mechanism further comprises:
a first mounting seat plate fixed to the end of the first pipe, the first mounting seat plate having a surface intersecting the longitudinal direction; and
a second mounting seat plate fixed to the end of the second pipe, the second mounting seat plate having a surface intersecting the longitudinal direction, and
wherein the first joint member is mounted to the first pipe via the first mounting seat plate, and the second joint member is mounted to the second pipe via the second mounting seat plate.

3. The work vehicle according to claim 1, wherein:
the first pipe and the second pipe are at a distance from each other in the longitudinal direction,
the at least one cross frame has a connection target end at a position within the distance in the longitudinal direction,
the first joint member and the second joint member of the connection mechanism each comprise a joint branch extending in a direction in which the at least one cross frame is present, and
the at least one cross frame is coupled to at least one of the joint branches.

4. The work vehicle according to claim 3,
wherein the at least one cross frame is a vertical post frame connected to the first pipe and the second pipe in such a manner as to intersect the first pipe and the second pipe along an up-down direction.

5. The work vehicle according to claim 4,
wherein the vertical post frame is a rectangular pipe member with a rectangular cross section, and comprises:
a cylindrical boss made of a tubular member penetrating the rectangular pipe member in a radial direction; and
a fixation bolt passed through the cylindrical boss, and
wherein the joint branch is configured to be pressed against and fixed to an end surface of the cylindrical boss while the fixation bolt is fastened.

6. The work vehicle according to claim 3, wherein:
the joint branches of the first joint member and the second joint member are laid on the upward facing surface,
the upward facing surface and the joint branches of the first joint member and the second joint member each have a bolt insertion hole, and
the upward facing surface, the first joint member, and the second joint member are configured to be coupled and fixed to each other by an upper coupling bolt passed through the bolt insertion holes.

7. The work vehicle according to claim 5, wherein:
the joint branches of the first joint member and the second joint member are laid on the upward facing surface,
the upward facing surface and the joint branches of the first joint member and the second joint member each have a bolt insertion hole,
the upward facing surface, the first joint member, and the second joint member are configured to be coupled and fixed to each other by an upper coupling bolt passed through the bolt insertion holes, and
the horizontal bridge frame has, at an end thereof located between the bolt insertion hole and the vertical post frame, a downward extending end surface bent downward from the upward facing surface, the downward extending end surface comprising a coupling target section facing an opposite end surface opposite to the end surface of the cylindrical boss, the fixation bolt passed through the cylindrical boss being passed through a coupling hole formed in the coupling target section, and the downward extending end surface configured to be pressed against the opposite end surface of the cylindrical boss while the fixation bolt is fastened.

8. The work vehicle according to claim 1,
wherein the first pipe and the second pipe are each a deformed tube with a non-circular cross-sectional shape.

\* \* \* \* \*